(12) United States Patent
Minami et al.

(10) Patent No.: US 6,738,094 B1
(45) Date of Patent: May 18, 2004

(54) VIDEO CAMERA

(75) Inventors: Katsuji Minami, Osaka (JP);
Mitsuyoshi Nakaya, Yamatotakada (JP); Mitsuji Sakai, Kishiwada (JP); Hideto Tominaga, Nara (JP); Seiji Muramoto, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/436,216

(22) Filed: Nov. 9, 1999

(30) Foreign Application Priority Data

| Nov. 9, 1998 | (JP) | ................................... 10-317296 |
| Mar. 5, 1999 | (JP) | ................................... 11-058259 |
| Jun. 24, 1999 | (JP) | ................................... 11-177594 |

(51) Int. Cl.⁷ .............................................. H04N 5/225
(52) U.S. Cl. ..................... 348/373; 348/375; 248/166
(58) Field of Search ........................ 348/373, 376, 348/374, 375; 248/439, 168

(56) References Cited

U.S. PATENT DOCUMENTS

| 5,855,343 A | * | 1/1999 | Krekelberg | .................. 248/121 |
| 5,880,783 A | * | 3/1999 | Ma | .............................. 348/373 |
| 6,239,841 B1 | * | 5/2001 | Verstockt et al. | ........... 348/373 |
| 6,431,507 B2 | * | 8/2002 | Prather et al. | .............. 248/166 |

FOREIGN PATENT DOCUMENTS

| FR | 2654603 A | 5/1991 |
| JP | 08288339 | 1/1996 |
| JP | 9-128091 A | 5/1997 |
| JP | 9-289604 A | 11/1997 |
| JP | 10-208024 A | 8/1998 |
| JP | 10-233948 | 9/1998 |

\* cited by examiner

*Primary Examiner*—Wendy R. Garber
*Assistant Examiner*—Jacqueline Wilson
(74) *Attorney, Agent, or Firm*—Birch, Stewart, Kolasch & Birch, LLP

(57) ABSTRACT

A video camera includes an abutment piece which is perpendicularly placed on the anterior side of the bottom of a stand portion and abuts on an attachment body to which the video camera is to be attached, a lever portion which is rotatably attached on the posterior side of the bottom of the stand portion, and bias means for biasing the lever potion toward the bottom of the stand portion. The lever portion includes an abutment portion formed such that it abuts on the abutment body. The lever portion holds the attachment body between the abutment portion and the abutment piece when it is used, and is housed in the stand portion such that it is pressurized to abut on the stand portion when it is not used. This structure enables the video camera to easily be attached to and detached from various attachment bodies such as flat display that are different from each other in thickness. When the video camera is detached from the body, the lever portion is compactly housed and accordingly the video camera can be placed directly on a flat surface for use.

8 Claims, 18 Drawing Sheets

VIDEO CAMERA

BACKGROUND OF THE INVENTION

1. Field of the Invention

The present invention relates to video cameras for input of image information to information equipment such as a computer. In particular, the invention relates to attachment and an installation structure of a video camera suitable for use with information equipment which employs a liquid crystal display or the like.

2. Description of the Background Art

Conventional video cameras which are used in the video conference system and the video telephone system are intended to be used with a personal computer of the desktop type. Most of them are thus placed for use on the thick upper surface portion of the CRT display. Japanese Patent Laying-Open No. 10-233948 discloses a video camera which is secured to a liquid crystal display of small thickness which drastically increases in number and a video camera which is placed on a flat portion for use.

According to a method proposed in this publication disclosing a television camera, a stand is rotated and raised, then a clamp is drawn to the thickness of a flat display, and the edge of the flat display is accordingly held between the clamp portion and a main body case using biasing force of a spring so as to fix the camera. When the television camera is to be placed on a flat portion, the stand is rotated and raised, and then the stand and the bottom of the main body case are made into contact with the flat portion so as to stand the camera.

The method disclosed in the above publication of holding the television camera on the flat display is complicated due to a number of operating procedures as described above. When the camera is placed on a flat portion, the direction in which the stand moves is different from that when the camera is held as above, leading to difficulty in intuitive understanding of the operating procedure.

SUMMARY OF THE INVENTION

One object of the present invention is to provide a video camera having an increased freedom concerning the location at which the camera is installed, being compact and presenting a good appearance. The increased freedom is accomplished by enabling with a simple operation attachment of the video camera to edges of flat displays of different thicknesses, holding of the video camera along the front edge of the upper surface of a CRT display, and placement of the video camera on a flat surface such as a desk.

In order to achieve the above object, according to one aspect of the invention, a video camera includes a main body case having therein a camera portion imaging an object and a camera control portion performing image signal processing and control relative to the camera portion, a holding portion rotatably holding the main body case, and a stand portion rotatably holding the holding portion. The video camera further includes an abutment piece which is perpendicularly placed on anterior side of a bottom of the stand portion and abuts on an attachment body to which the video camera is attached, a lever portion which is rotatably placed on posterior side of the bottom of the stand portion, and bias means for biasing the lever portion toward the bottom of the stand portion. The lever portion includes a lever main body with its one end pivotally supported by the stand portion and an abutment portion located at the other end of the lever main body and formed to abut on the attachment body. The lever portion holds the attachment body between the abutment portion and the abutment piece when the lever portion is used and the lever portion is housed and pressurized to abut on the stand portion when it is not used.

The video camera which employs this structure can be attached easily to various attachment bodies such as flat display that are different in thickness just by pulling out the lever portion. Further, the lever portion is compactly housed in the stand portion just by detaching the lever from the attachment body. With the lever portion housed therein, the video camera can be placed on a CRT display or a flat surface.

Preferably, an edge portion of the stand portion is perpendicularly placed downward to form a vertical wall, and the lever potion is housed in the vertical wall when it is not used. Since the lever portion is hidden by the vertical wall and thus invisible, this structure thus employed gives a better appearance to the video camera and enhances the strength of the stand portion.

Preferably, the abutment portion has a flat abutment surface which abuts on the attachment body and the abutment portion is rotatably supported at a leading end of the lever main body such that the flat abutment surface is in surface contact with the attachment body when the lever portion is used. The structure thus employed increases the area which pinches the attachment body to stabilize fixing of the video camera.

Still preferably, an antiskid piece is provided to a surface of the abutment piece that abuts on and holds the attachment body and/or to the abutment surface of the abutment portion that holds the attachment body. The structure thus employed prevents the video camera from slipping off and thus the video camera is surely fixed when the attachment body is pinched by the video camera between its components.

Preferably, an antiskid piece is provided to a bottom surface of the lever portion when the lever portion is not used and housed. The structure thus employed prevents the video camera placed on the upper surface of a CRT display from slipping or falling off.

Preferably, the abutment piece is integrated with and extends from the vertical wall of the stand portion. The structure thus employed simplifies the structure of the video camera and accordingly presents an excellent outer design.

Preferably, when the lever portion is not used, a tab which is integrally formed with the abutment portion faces a hole placed at the lever portion. The structure thus employed allows the tab to be raised easily with a finger (fingers) when the video camera is attached or detached, improving ease of operation.

Still preferably, the abutment portion and the tab are integrally formed of resin and the tab is flexible relative to the abutment portion. In the structure thus employed, the tab can easily be caught with a finger (fingers) and accordingly the abutment portion can be raised easily since the tab is flexible relative to the abutment portion and thus bowed just by lightly catching with the finger(s). In addition, the shape of components can be simplified and assembly thereof becomes easier.

According to another aspect of the invention, a video camera includes a main body case having therein a camera portion imaging an object and a camera control portion performing image signal processing and control relative to the camera portion, a holding portion rotatably holding the main body case, and a stand portion rotatably holding the holding portion. The video camera further includes an edge portion perpendicularly placed downward to form a vertical wall on anterior side of the stand portion, a sliding member freely moving back and forth in the stand portion, a guide which is placed behind and opposite to the sliding member and freely moves back and forth in the stand portion, an elastic member biasing in a direction to separate the sliding member and the guide from each other, a button portion provided to the guide for operating the guide, and an engaging portion with concave and convex parts which engage with each other at a sliding surface at which the button portion or the guide is opposite to the stand portion. The button portion is operated to hold an attachment body to which the video camera is attached between the edge portion and the sliding member.

The video camera which employs this structure can be attached easily to various attachment bodies such as flat display that are different in thickness just by pulling out the lever portion. Further, the lever portion is compactly housed in the stand portion just by detaching the lever from the attachment body. With the lever portion housed therein, the video camera can be placed on a CRT display or a flat surface.

Preferably, the video camera includes a stopper provided to the sliding member for restricting movement such that interval between the sliding member and the guide does not exceed a predetermined distance. The structure thus employed limits the interval between the sliding member and the guide within a predetermined distance, so that the elastic member can be used only within a range of its natural length and accordingly its elastic force can effectively be utilized.

Preferably, the sliding member includes a lever portion rotatably attached on its anterior side, the attachment body is held between the edge portion and the lever portion, and the lever portion is housed in the stand portion when the lever portion is not used.

The structure thus employed enables the video camera to be attached easily to various attachment bodies such as flat display that are different in thickness. When the video camera is detached, the lever portion is compactly housed in the stand portion and the video camera can be placed on a CRT display or a flat surface with the lever portion housed therein.

Preferably, the sliding member includes a slide shaft formed on its posterior side in parallel with direction in which the sliding member slides. This structure thus employed ensures constant posture of the sliding portion when it slides.

Preferably, the button portion includes a button provided to the guide such that the button protrudes upward and passes through an opening formed at an upper surface of the stand portion to allow the guide to be operated from above the stand portion to move. This structure thus employed enables the guide to be operated easily from above the stand portion.

Preferably, an antiskid piece is provided to a surface of the edge portion that abuts on and holds the attachment body and/or to a surface of the lever portion that abuts on and holds the attachment body. This structure thus employed can prevent the video camera from slipping off when the camera holds the attachment body and accordingly the camera can surely be fixed.

Preferably, an antiskid piece is provided to a bottom surface of the lever portion when the lever portion is not used and housed. The structure thus employed can prevent the video camera placed on the upper surface of a CRT display from slipping or dropping off.

Preferably, the guide portion and the button portion are integrally formed of resin and made flexible by providing a groove extending side to side at a resin portion ahead of the engaging portion with concave and convex parts provided to the button portion. In the structure thus employed, the engagement of the engaging portion can be released by pushing down the button portion since the button portion is flexible relative to the guide portion, and the forward and backward movement of the button and guide portions becomes easier.

According to still another aspect of the invention, a video camera includes a main body case having therein a camera portion imaging an object and a camera control portion performing image signal processing and control relative to the camera portion, a holding portion rotatably holding the main body case, and a stand portion rotatably holding the holding portion. The video camera further includes an edge portion perpendicularly placed downward to form a vertical wall on anterior side of the stand portion, a bottom cover covering an opening at bottom of the stand portion, and a pair of leg members located in a space formed by the stand portion and the bottom cover, one end of each of the leg members having a gear and the other end having a pinching section for pinching an attachment body to which the video camera is attached. The pair of leg members is pivotally supported such that the leg members can rotate oppositely in horizontal direction and the gears engage with each other on posterior side of the stand portion. An elastic member is provided which biases in a direction to cause pinching sections of the pair of leg members on anterior side of the stand portion to approach each other. The attachment body is held between the edge portion and the pair of leg members when the leg members are used, and the leg members are housed in the stand portion when the leg members are not used.

The video camera which employs this structure can be attached easily to various attachment bodies such as flat display that are different in thickness just by pulling out the leg member. Further, the lever portion is compactly housed in the stand portion just by detaching the leg members from the attachment body. With the lever portion housed therein, the video camera can be placed on a CRT display or a flat surface.

Preferably, an antiskid piece is provided to a surface of the edge portion which abuts on and holds the attachment body and/or to a surface of the leg members which abut on and hold the attachment body. The structure thus employed can prevent the video camera holding the attachment body from slipping off and the video camera can surely be fixed accordingly.

Preferably, an antiskid piece is provided to bottom surfaces of the leg members when the leg members are not used and housed. The structure thus employed can prevent the video camera placed on the upper surface of a CRT display from slipping or dropping off.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
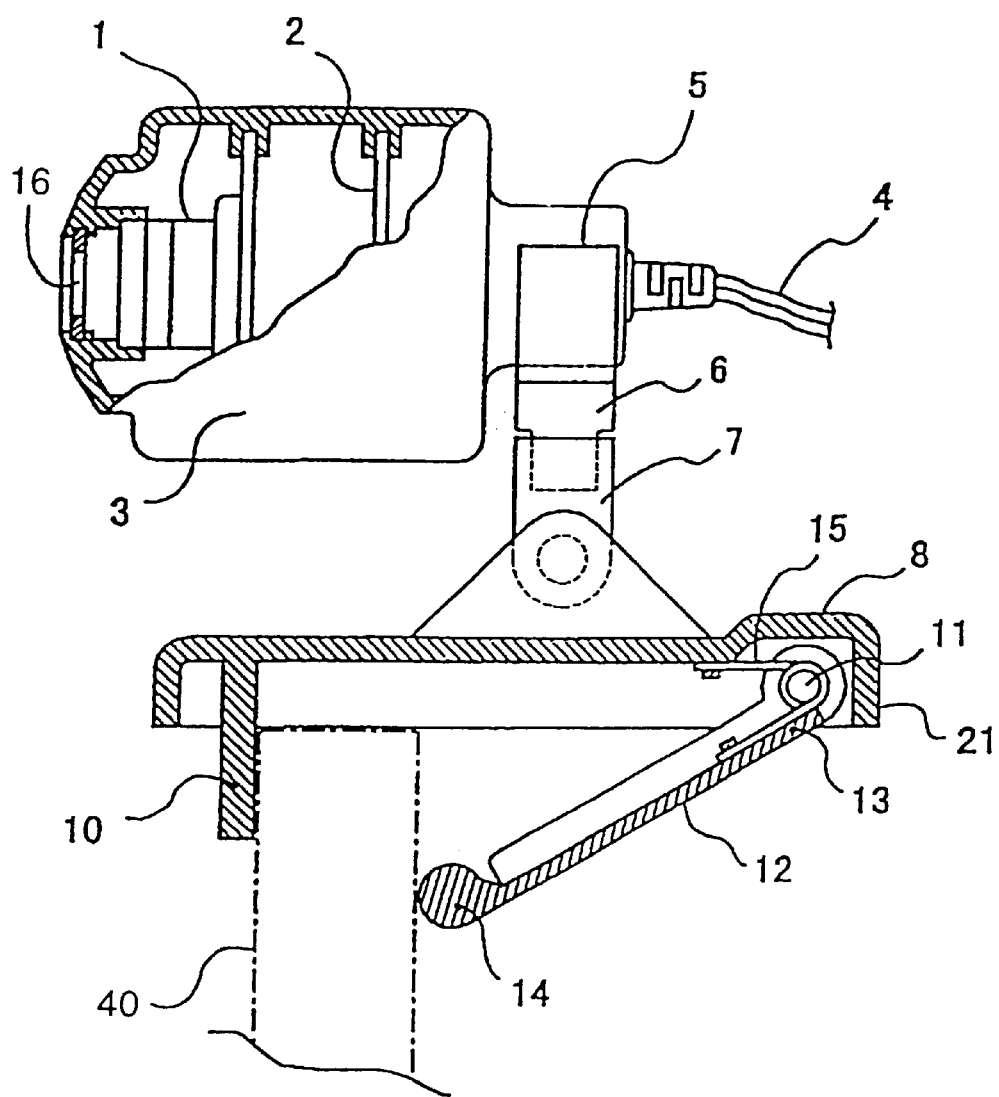
FIG. 1 is a side cross sectional view of a video camera in a first embodiment of the present invention illustrating that the video camera is secured to a flat display.
Figure 2:
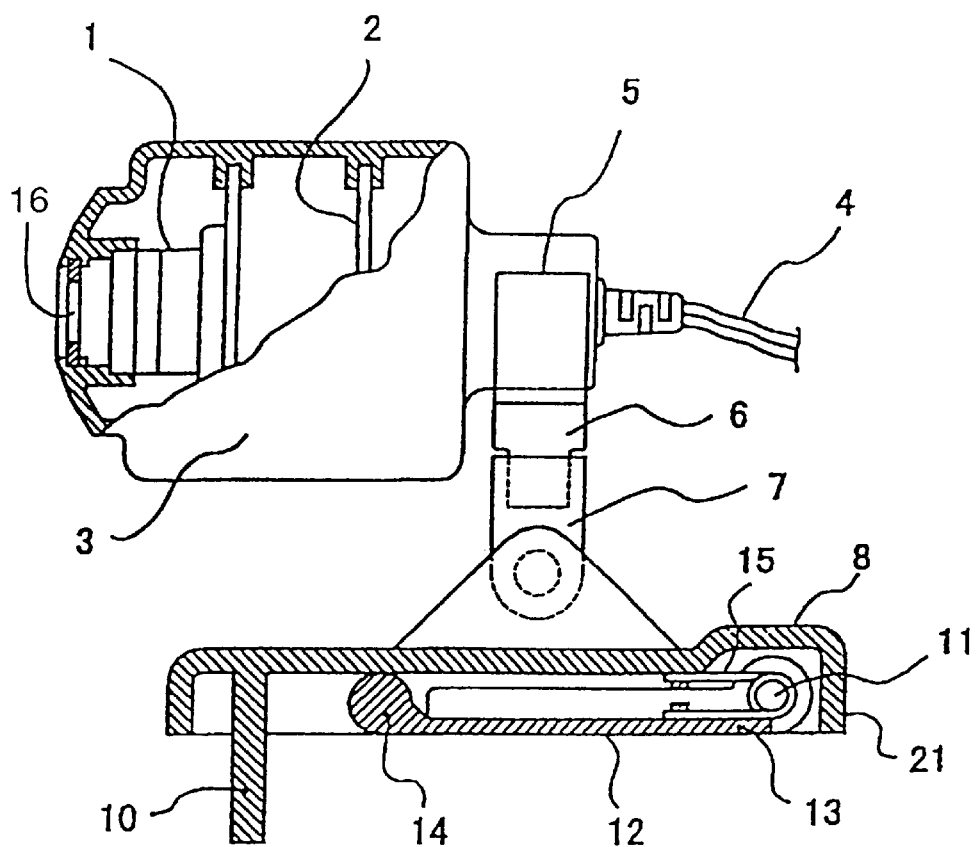
FIG. 2 is a side cross sectional view of the video camera in the first embodiment of the present invention illustrating that a lever portion is housed in a stand portion.
Figure 3:
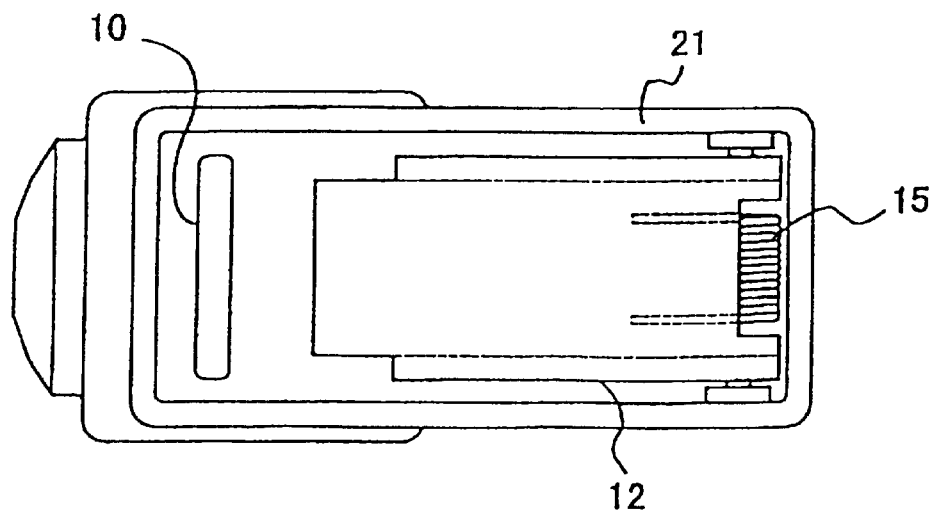
FIG. 3 is a bottom view of FIG. 2.

The first embodiment of the present invention is now described in detail in conjunction with FIGS. 1 to 3.

FIG. 1 is a side cross sectional view illustrating that a video camera is fixed to an attachment body (any unit to which the video camera is attached) such as flat display. A camera portion 1 which images an object is formed of a lens for imaging the object and a drive circuit which concentrates light of the image of the object onto a solid imaging device and converts the image into an electric signal by the solid imaging device.

The electric signal from camera portion 1 is processed by a camera control portion 2 for image signal processing and control so as to produce an image signal, and the image signal is output from a signal cable 4 inserted through the rear surface of a main body case 3. Camera portion 1 and camera control portion 2 are fixed to the inside of main body case 3. Main body case 3 and a stand portion 8 described below are connected via a holding portion 5.

Holding portion 5 is constituted of an upper holding portion 6 which rotatably holds main body case 3 and a lower holding portion 7 which is rotatably and pivotally supported by a pair of triangular projecting pieces placed on the upper surface of stand portion 8. Upper holding portion 6 is connected to lower holding portion 7 by fitting together respective cylindrically shaped projection and hollow which rotationally slide on each other such that upper holding portion 6 can rotate clockwise and anticlockwise by approximately 180° relative to lower holding portion 7.

The rear section of main body case 3 is cylindrically shaped and the upper section of upper holding portion 6 is cylindrically shaped with a partial cut, i.e. C-shaped with its opening facing upward. The cylindrical section of main body case 3 is inserted to the C-shaped section such that main body case 3 is rotatably held on upper holding portion 6.

Attachment and detachment of main body case 3 and upper holding portion 6 in the direction of the axis of main body case 3 is impossible. Main body case 3 can be attached and detached by temporarily opening wide the partial opening of the cylindrical section of upper holding portion 6 by utilizing the elasticity of upper holding portion 6 formed of plastic or metal.

In these structures, camera portion 1 built in main body case 3 can rotate about the optical axis and on a horizontal surface by 360° and can move up and down about an axis by a certain degree.

When viewed from the above or below, stand portion 8 is substantially rectangular and the longitudinal direction thereof corresponds to the forward and backward direction. The upper surface of stand portion 8 pivotally supports lower holding portion 7 as described above, and an abutment piece 10 is perpendicularly placed on the anterior side of the bottom of stand portion 8 for fixing an attachment body 40 such as a flat display of a personal computer.

An axis of rotation 11 is provided on the posterior side of the bottom of stand portion 8 and a lever portion 12 is further provided with its one end rotatably and pivotally supported by axis of rotation 11. Bias means 15 formed of coil spring or leaf spring which always biases lever portion 12 toward stand portion 8 is placed internally between lever portion 12 and stand portion 8.

Lever portion 12 is constituted of a lever main body 13 with its one end pivotally supported by axis of rotation 11 as described above and an abutment portion 14 formed with a rounded section at the other end of lever main body 13 so as to abut on the rear surface of the flat display.

A shutter 16 capable of blocking the optical path when image formation is not performed is provided on the front side of camera portion 1 such that it slides on main body case 3.

FIG. 2 is a side cross sectional view and FIG. 3 is a bottom view illustrating that the lever portion is housed in the stand portion.

Referring to FIGS. 2 and 3, a vertical wall 21 is placed downward along the edge around stand portion 8. Bias means 15 functions to make the height of the bottom of lever portion 12 almost identical to the height of vertical wall 21 when lever portion 12 is housed in stand portion 8.

An operation carried out with this structure is discussed now. When a video camera is fixed for use on the edge of attachment body 40 such as flat display, lever portion 12 as shown in FIGS. 2 and 3 is raised with fingers against the biasing force of bias means 15 so as to place abutment piece 10 along one surface of attachment body 40 and then allow abutment portion 14 at the leading end of lever portion 12 to abut on the opposite surface of attachment body 40. Then lever portion 12 is released from the fingers, accordingly attachment body 40 is held between abutment piece 10 and abutment portion 14, and thus the video camera is held and fixed by the biasing force of bias means 15 (as shown in FIG. 1).

The video camera can easily be detached from attachment body 40 just by raising lever portion 12. The video camera is made compact as lever portion 12 is housed such that it is pressurized toward the bottom of stand portion 8 and abuts thereon by the biasing force of bias means 15. In addition, the video camera is improved in appearance since lever portion 12 is concealed by vertical wall 21.

Second Embodiment

The second embodiment of the present invention is described in detail below in conjunction with FIGS. 4 to 6.

Figure 4:
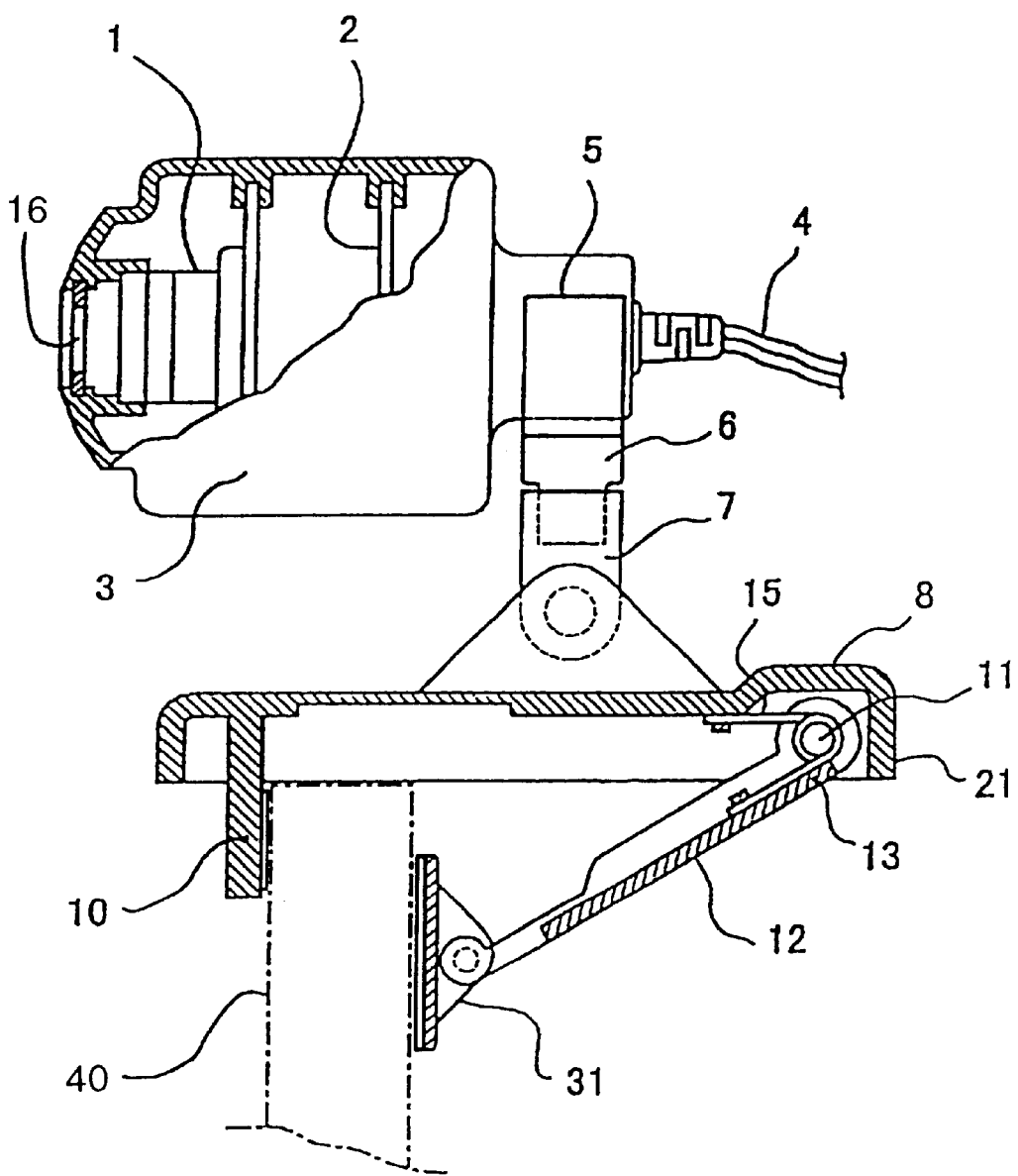
FIG. 4 is a side cross sectional view of a video camera in a second embodiment of the invention illustrating that the video camera is secured to a flat display.
Figure 5:
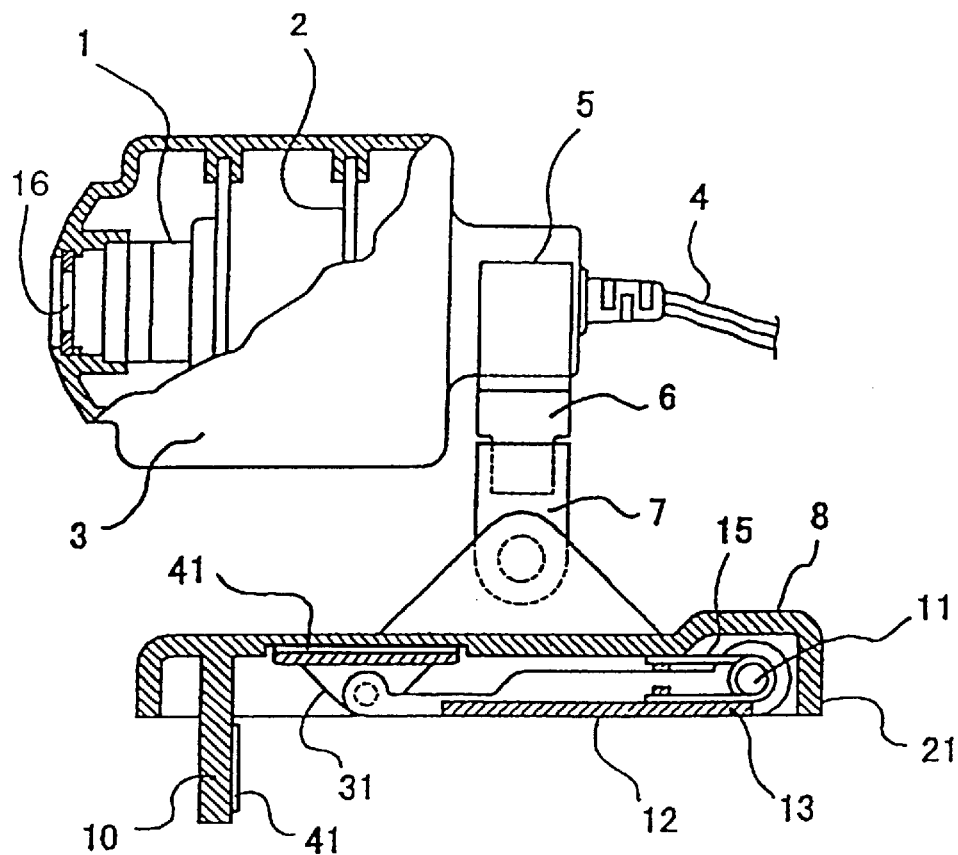
FIG. 5 is a side cross sectional view of the video camera in the second embodiment of the invention illustrating that a lever portion is housed in a stand portion.
Figure 6:
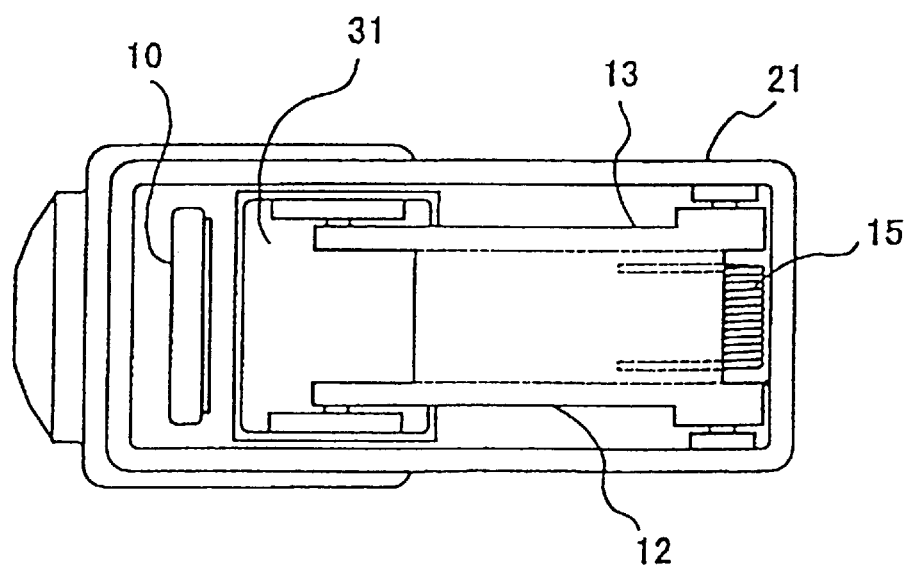
FIG. 6 is a bottom view of FIG. 5.

FIG. 4 is a side sectional view illustrating that a video camera is fixed to a flat display, and FIG. 5 is a side sectional view and FIG. 6 is a bottom view illustrating that a lever portion is housed in a stand portion.

The only difference between the first and the second embodiments is that a plate 31 described below is used in the second embodiment instead of abutment portion 14 of lever portion 12. Description of those components except for this difference is not repeated here and the same components have the same reference character for the purpose of description.

Plate 31 with a flat surface abutting on an attachment body 40 is rotatably and pivotally supported on the leading end of a lever portion 12. The line of the rotational axis of plate 31 is horizontally kept so as to allow the flat surface of plate 31 to be in surface contact with attachment body 40 all the time even if attachment body 40 of a different width is held between plate 31 and abutment piece 10. An antiskid piece 41 formed of material such as rubber having a great frictional resistance is provided to each of the surfaces of abutment piece 10 and plate 31 that are in contact with attachment body 40 when they hold attachment body 40 therebetween.

Such a structure increases the area of abutment piece 10 and plate 31 which hold attachment body 40 therebetween, and accordingly the video camera is more stably held and fixed. Further, thus provided antiskid piece 41 prevents the video camera from shifting due to vibration and accordingly the video camera is far more stably held and fixed.

It is noted that plate 31 on the leading end of lever portion 12 is housed in the bottom of stand portion 8 with its flat section upward when lever portion 12 is housed in stand portion 8 (see FIGS. 5 and 6).

Third Embodiment

Description of the third embodiment is presented in detail below in conjunction with FIG. 7.

Figure 7:
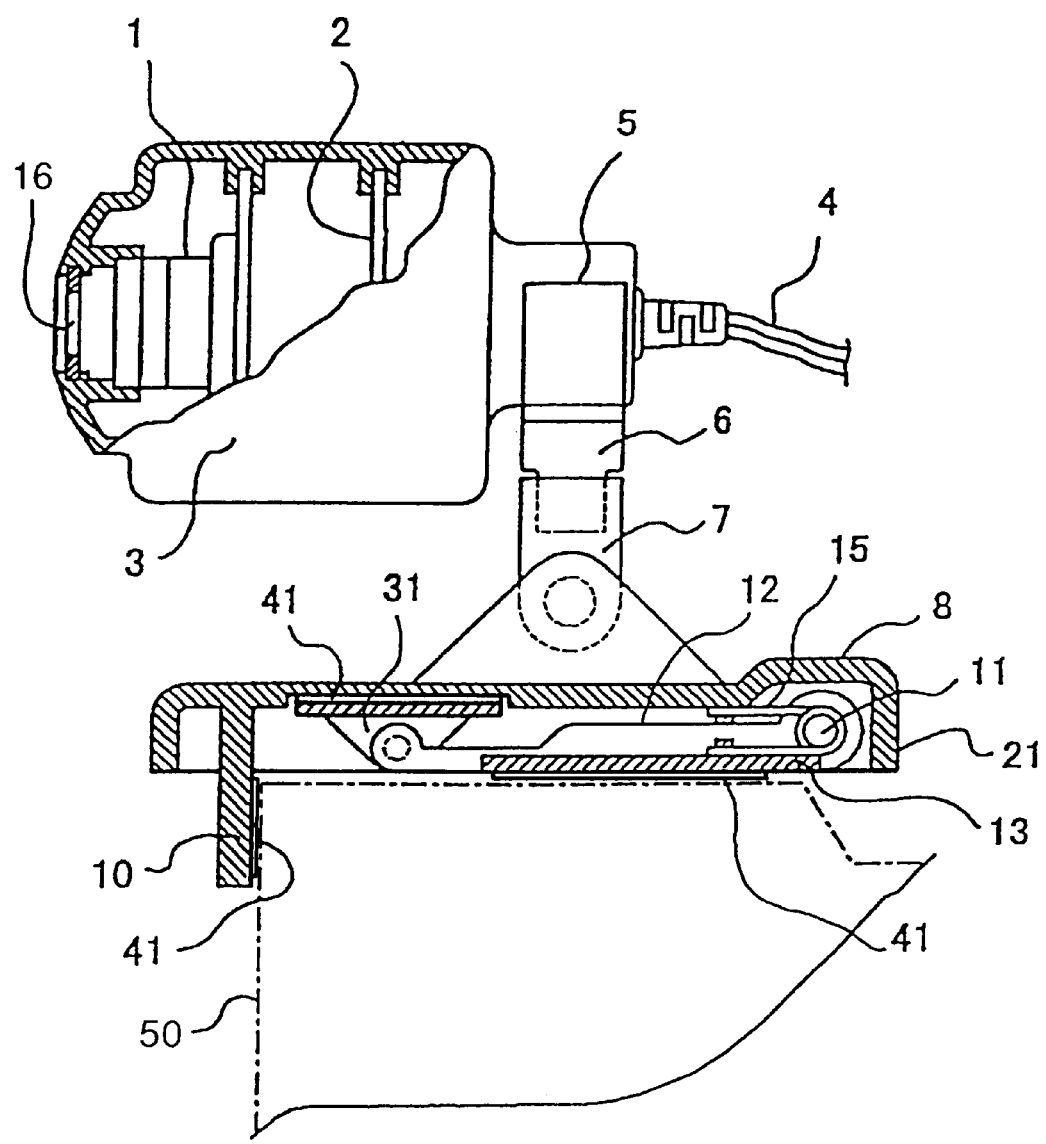
FIG. 7 is a side cross sectional view of a video camera in a third embodiment of the invention illustrating that the video camera is mounted on a CRT display.

FIG. 7 is a side sectional view illustrating that a video camera is mounted for use on a CRT display. The only difference between the third and the first embodiments is that an antiskid piece 41 formed of rubber is provided on a surface of a lever main body 13 in the third embodiment. Description of those components except for this portion is not repeated here and the same components are denoted by the same reference character for the purpose of description.

When the video camera is to be attached on CRT display 50 as shown in FIG. 7, a lever portion 12 cannot be used to hold CRT display 50 between it and an abutment piece 10 since CRT display 50 is thick. Then, the housed lever portion 12 may be left as it is, and abutment piece 10 may be placed along the edge of CRT display 50 while bringing lever portion 12 into contact with the upper surface of CRT display 50 in order to mount the video camera.

In this case, antiskid piece 41 formed of material having a high frictional resistance such as rubber is placed on the surface of the bottom of lever portion 12 which is in contact with CRT display 50, so that movement, shift, falling of the video camera due to vibration, impact or the like can be prevented.

It is noted that use of a suction plate as the antiskid piece similarly brings about a considerable effect.

Fourth Embodiment

Figure 8:
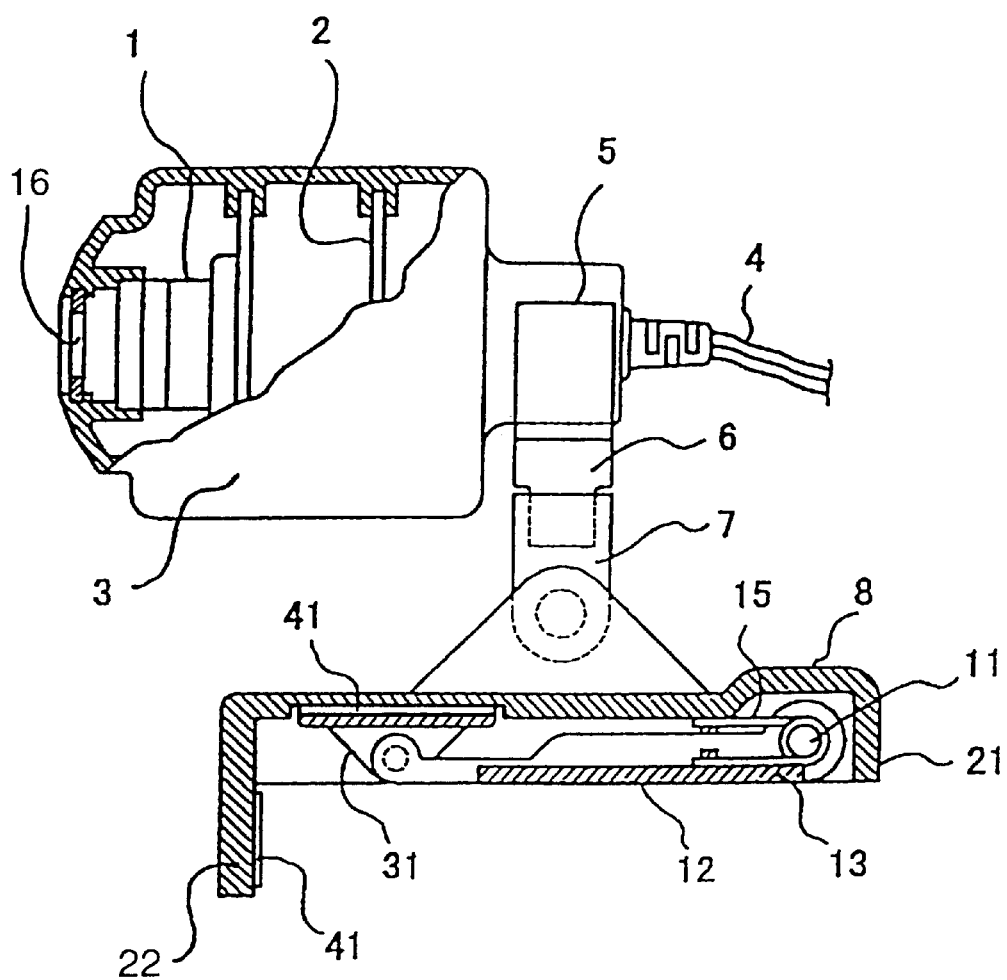
FIG. 8 is a side cross sectional view of a video camera in a fourth embodiment of the invention.
Figure 9:
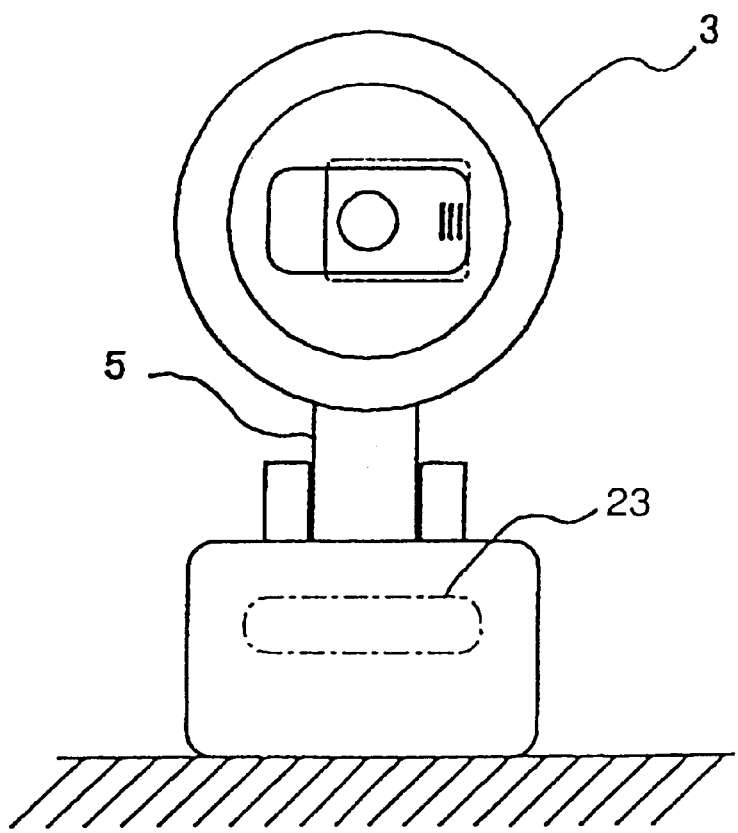
FIG. 9 is a front view of the video camera in the fourth embodiment of the invention illustrating that the video camera is placed on a flat surface such as a desk.
Figure 10:
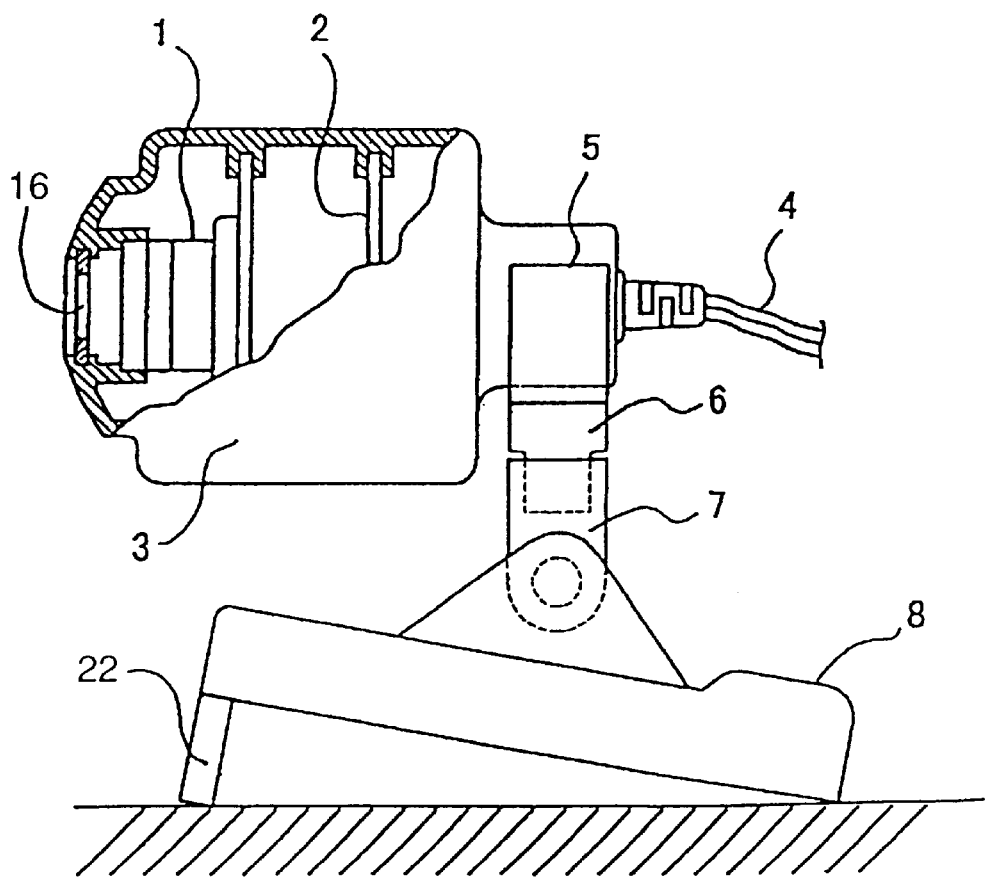
FIG. 10 is a side view of FIG. 9.

The fourth embodiment of the present invention is now described in detail in conjunction with FIGS. 8 to 10.

FIG. 8 is a side cross sectional view of a video camera in this embodiment, FIG. 9 is a front view and FIG. 10 is a side view thereof illustrating that the video camera is placed on a flat surface such as that of a desk.

The fourth embodiment is different from the first to the third embodiments discussed above only in that the vertical wall of stand portion 8 and abutment piece 10 in the first to the third embodiments are integrated to form a vertical wall 22 in the fourth embodiment. Description of those components except for this portion is not repeated here and the same components are denoted by the same reference character for description.

Referring to FIG. 8, vertical wall 22 located on the anterior side of the bottom of a stand portion 8 extends downward below the bottom line of lever portion 12, and the extension forms an abutment surface for holding an attachment body such as flat display between the abutment surface and a plate 31. The vertical wall of the three sides except for the front side is formed at almost the same height as that of the bottom line of lever portion 12. Compared with the combination of abutment piece 10 and vertical wall 21 formed around stand portion 8 shown in FIGS. 2 and 3, vertical wall 22 on the anterior side of the bottom of stand portion 8 achieves simplification of the shapes of components by combining the two functions.

A small-sized video camera of recent years has a limited location on which logo or the like can be marked. If the video camera is placed for use on a desk or the like as shown in FIGS. 9 and 10, the outer face of vertical wall 22 on the anterior side of the bottom of stand portion 8 faces the user of a personal computer. Therefore, if a logo mark 23 is printed on this flat portion, the design effect is enhanced. Of course logo mark 23 may be sealed or etched directly on the vertical wall.

Fifth Embodiment

Figure 11:
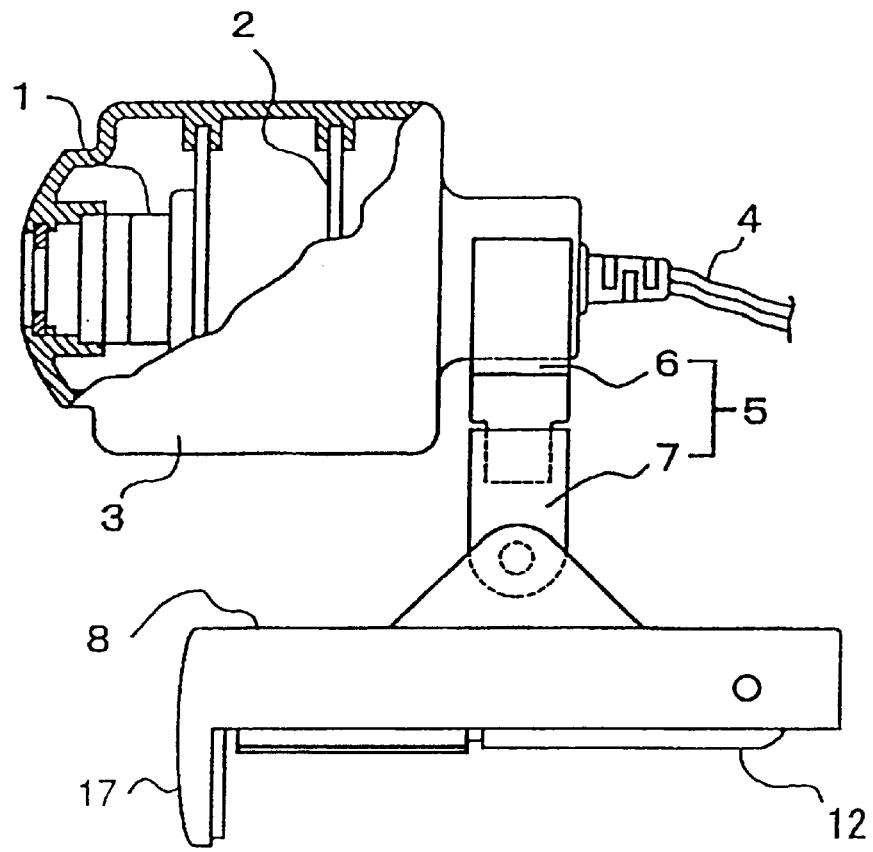
FIG. 11 is a side cross sectional view of a video camera in a fifth embodiment of the invention.
Figure 12:
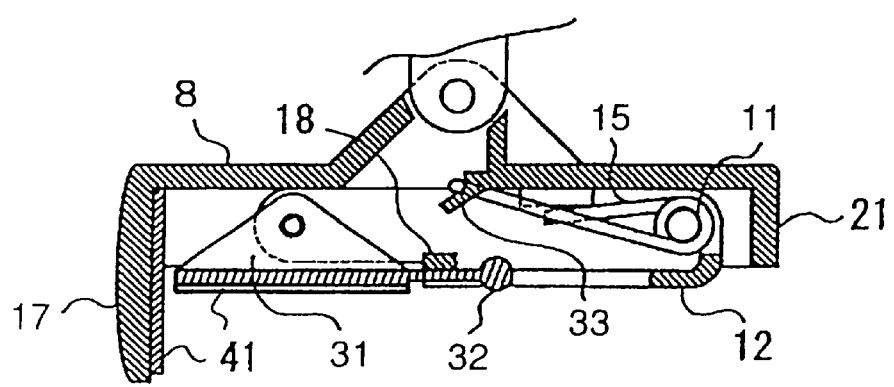
FIG. 12 is a side cross sectional view of the video camera in the fifth embodiment of the invention illustrating that a lever portion is housed in a stand portion.

FIG. 11 is a side cross sectional view of a video camera in this embodiment. FIG. 12 is a side cross sectional view illustrating that a lever portion is housed in a stand portion. Stand portion 8 is shaped into a box with an opening on the bottom and is substantially rectangular in shape when viewed from the above or below, and the longitudinal direction thereof corresponds to the forward and backward direction. An axis of rotation 11 is provided on the posterior side of the bottom of stand portion 8, lever portion 12 with one end rotatably and pivotally supported on rotational axis 11 is further provided. An elastic member 15 such as torsion coil spring which always biases lever portion 12 toward stand portion 8 is internally placed between lever portion 12 and stand portion 8. Other components are identical to those in the above-described embodiments and description thereof is not repeated here.

A lower holding portion 7 is pivotally supported on the upper surface of stand portion 8 as described above, and an edge portion 17 for securing an attachment body such as a flat display of a personal computer is perpendicularly placed on the anterior side of stand portion 8. The part of stand portion 8 which pivotally supports lower holding portion 7 has an opening in the vertical direction in order to form, at a pair of triangular projecting pieces located on the upper surface, an axis portion for pivotally supporting lower holding portion 7. A hooked projection 33 is formed in the opening from the posterior side toward the anterior side of stand portion 8 so as to hold one end of elastic member 15.

A plate 31 which has a flat surface to be abutted on an attachment body 40 as described below is rotatably and pivotally supported on the leading end of lever potion 12, and the rotational axis thereof is horizontal and in parallel with edge portion 17. Accordingly, even if attachment body 40 of a different thickness is held between edge portion 17 and plate 31, the flat surface of plate 31 is always in surface contact with attachment body 40.

When plate 31 is housed in stand portion 8, the flat surface of plate 31 faces downward. A tab 32 projecting from plate 31 toward the posterior side of the bottom of stand portion 8 has its leading end facing a rounded hole formed at the center of lever portion 12. An antiskid piece 41 formed of material such as rubber having a great frictional resistance is provided to each of the surfaces of edge portion 17 and plate 31 that are in contact with attachment body 40 held therebetween.

A vertical wall 21 is placed downward along the edge around stand portion 8. When lever portion 12 is housed in stand portion 8 by the function of elastic member 15, the height of the bottom surface of lever portion 12 and that of the flat portion including antiskid piece 41 of plate 31 are almost identical and their height projects slightly below from the bottom surface of vertical plate 21.

Figure 13:
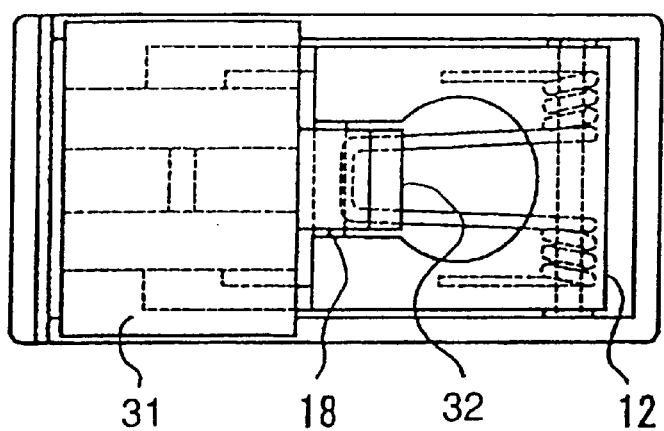
FIG. 13 is a bottom view of the video camera in the fifth embodiment of the invention.

FIG. 13 is a bottom view of the video camera in this embodiment. In order to prevent the tab which is integrated with plate 31 from protruding from the abutment surface of plate 31 when lever portion 12 is housed, a step 18 is provided to lever portion 12. The leading end of tab 32 is placed to extend slightly inside the inscribing circle of the rounded hole located at the center of lever portion 12. Further, the leading end of tab 32 has a bulge with circular cross section for preventing fingers which pull the tab from slipping from it.

Figure 14:
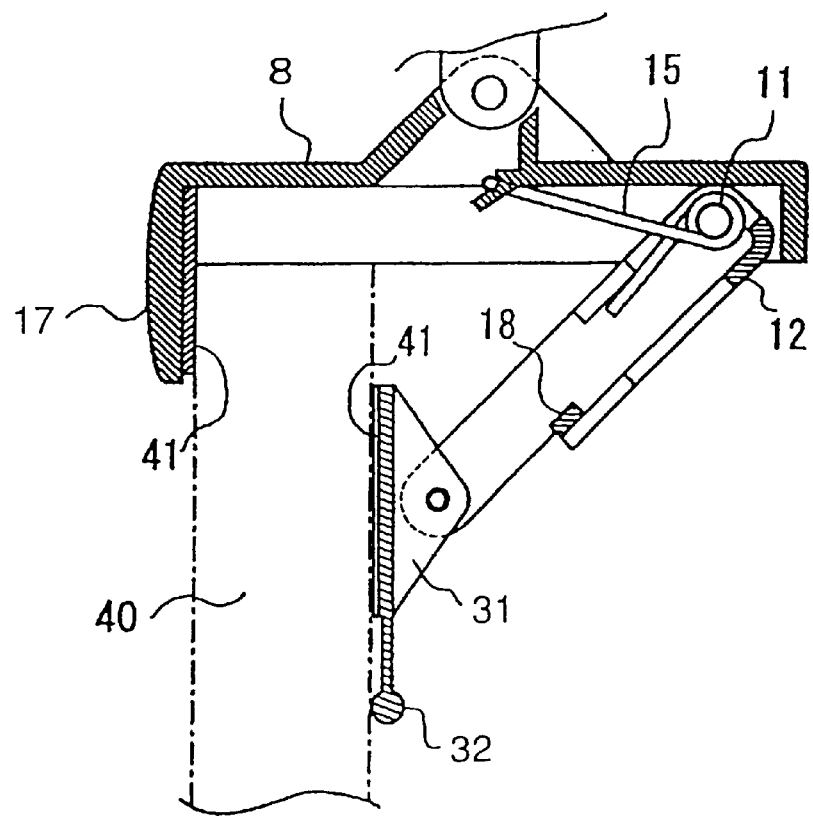
FIG. 14 is a side cross sectional view of the video camera in the fifth embodiment of the invention illustrating that the video camera is secured to an attachment body such as flat display.

FIG. 14 is a side cross sectional view illustrating that the attachment body is pinched by the video camera between its components. Referring to FIG. 14, attachment body 40 is a flat display or the like to which the video camera is attached. An antiskid piece 41 formed of material such as rubber having a great frictional resistance is provided to each of the surfaces of edge portion 17 and plate 31 that are brought into contact with the attachment body when the video camera pinches attachment body 40 between its components.

Figure 15:
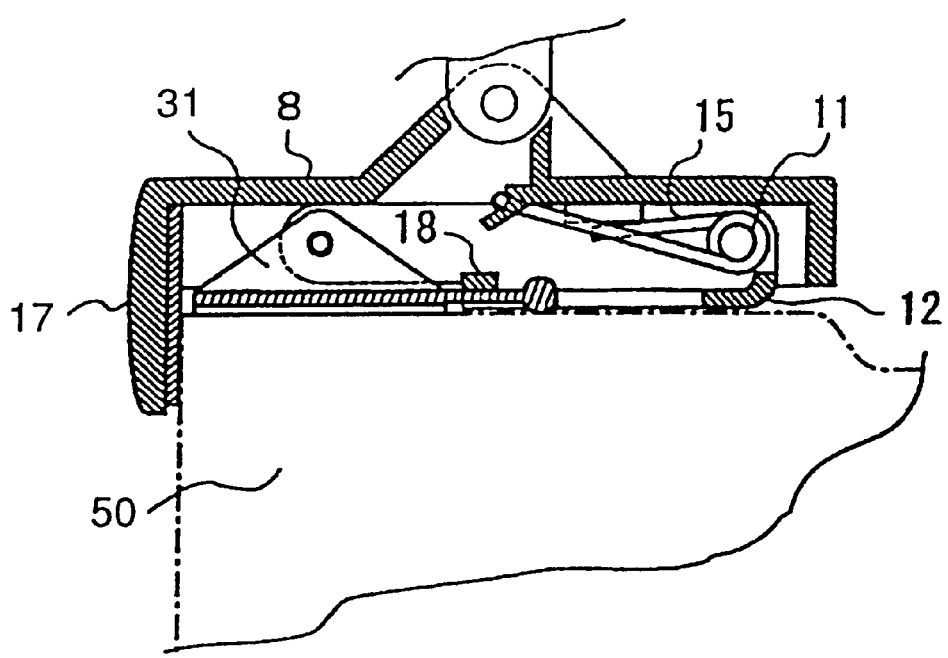
FIG. 15 is a side cross sectional view of the video camera in the fifth embodiment of the invention illustrating that the video camera is mounted on a CRT display.
Figure 16:
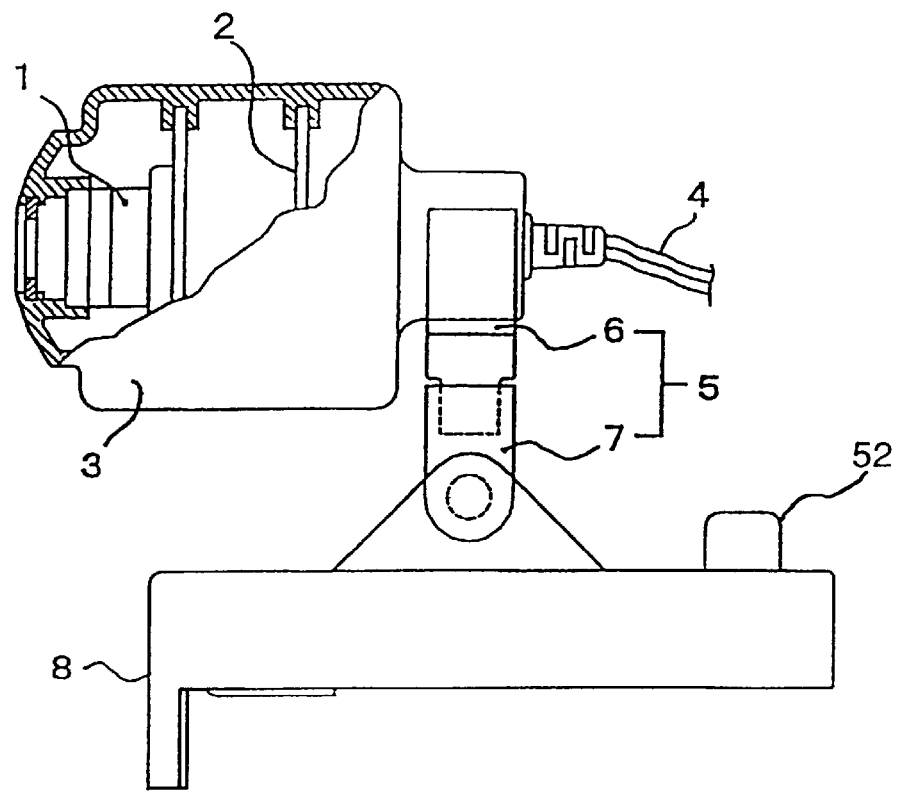
FIG. 16 is a side cross sectional view of a video camera in a sixth embodiment of the invention.

FIG. 15 is a side cross sectional view illustrating that the video camera of the present invention is mounted for use on a CRT display. An antiskid piece 41 formed of material such as rubber having a great frictional resistance is provided to each of the surfaces of edge portion 17 and plate 31 that are in contact with the display.

An operation carried out in this structure is described now. Referring to FIGS. 12 and 13, when the video camera is to be fixed for use on the edge of attachment body 40 such as flat display, any finger (fingers) is (are) inserted into the hole of lever portion 12 to pull tab 32 downward so as to raise it, edge portion 17 is placed along one surface of attachment body 40, and then tab 32 is released to allow attachment body 40 to abut on the flat portion of plate 31, i.e. to pinch attachment body 40.

At this time, plate 31 which is rotatably and pivotally supported on the leading end of lever portion 12 is brought into contact with attachment body 40 via elastic member 15. In this way, the video camera holds attachment body 40 between edge portion 17 and plate 31. Antiskid piece 41 provided to each of edge portion 17 and plate 31 prevents the video camera from shifting due to vibration or the like which occurs when the attachment body 40 is pinched, and accordingly the video camera is more stably held and fixed.

If plate 31 which is integrally formed with tab 32 is formed of relatively low-cost polyethylene resin or the like and a rib is provided on the back side of the surface of plate 31 abutting on attachment body 40 so as to give a proper rigidity, antiskid piece 41 can be eliminated and both of the flexibility and antiskid on the abutting surface can be obtained.

Referring to FIG. 14, when the video camera is detached from attachment body 40, tab 32 is pulled downward to release attachment body 40 so that the video camera can be detached from attachment body 40.

The video camera cannot pinch CRT display 50 with a great thickness utilizing lever portion 12. The video camera is then mounted on the upper surface of CRT display 50 by housing lever portion 12 as shown in FIG. 15 and placing edge portion 17 along the front edge of CRT display 50. In this state, antiskid piece 41 provided on the bottom of plate 31 can prevent movement, shift, fall and the like of the video camera due to vibration, impact or the like.

Sixth Embodiment

The sixth embodiment of the present invention is described in detail below in conjunction with FIGS. 16 to 22.

Figure 17:
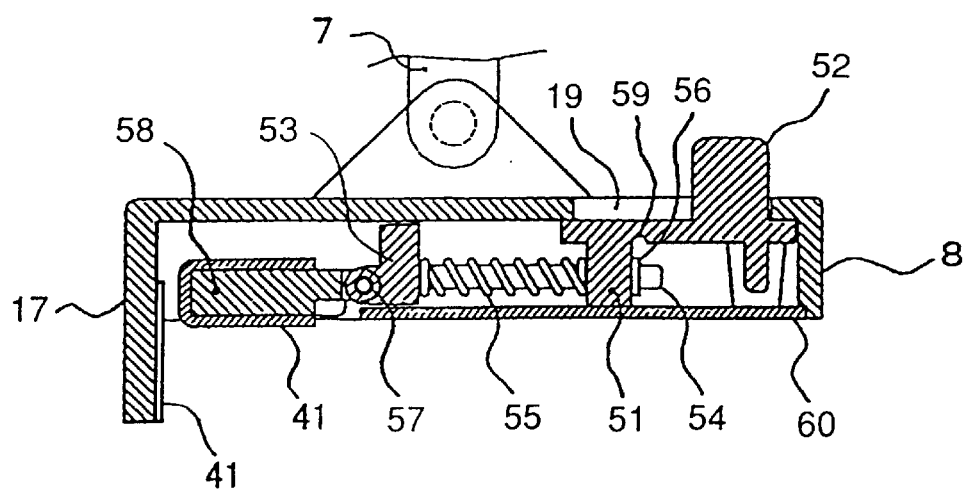
FIG. 17 is a side cross sectional view of the video camera in the sixth embodiment of the invention illustrating that a lever portion is housed in a stand portion.

Fit. 16 is a side cross sectional view of a video camera in this embodiment. FIG. 17 is a side cross sectional view illustrating that a lever portion is housed in a stand portion. Stand portion 8 is formed into a box with an opening at the bottom, rectangular in shape when viewed from the above or below, and its longitudinal direction corresponds to the forward and backward direction. A flat bottom cover 60 which covers the bottom opening of stand portion 8 is secured to stand portion 8 with fixing means such as screwing member. A lower holding portion 7 is pivotally supported on the upper surface of stand portion 8 as described above, and an edge portion 17 is perpendicularly placed on the anterior side of stand portion 8 for fixing an attachment body such as a flat display of a personal computer.

A guide 51 is provided such that it can slide back and forth in the space formed by stand portion 8 and bottom cover 60. A button 52 formed of resin integrally with guide 51 is placed such that its operating portion projects from an opening 19 located at the upper surface on the posterior side of stand portion 8. Other components are identical to those in the embodiments discussed above and description thereof is not repeated here.

A sliding member 53 is located ahead of guide 51 and can slide back and forth in the space formed by stand portion 8 and bottom cover 60. The forepart of sliding member 53 has a rotational axis 57, a lever portion 58 having one end rotatably and pivotally supported by rotational axis 57 is provided, and bias means formed of coil spring, leaf spring or the like is internally placed between lever portion 58 and sliding member 53 for biasing lever portion 58 toward stand portion 8 all the time.

It is noted bottom cover 60 does not cover the part under lever portion 58 so as not to hinder lever portion 58 from rotating. On the posterior side of sliding member 53, a slide shaft 54 extends backward in parallel with the sliding direction of sliding member 53. Slide shaft 54 fits in a hole formed in guide 51 and thus sliding member 53 and guide 51 fit and slide back and forth along slide shaft 54 relative to each other.

An elastic member 55 is inserted into slide shaft 54 at the portion between sliding member 53 and guide 51 so that sliding member 53 and guide 51 are separated from each other by the biasing force of elastic member 55. In order to keep the interval between sliding member 53 and guide 51 within a predetermined distance and prevent slide shaft 54 from dropping off from the hole of guide 51, a stop ring 56 serving as a stopper is attached in a groove formed at slide shaft 54.

Figure 18:
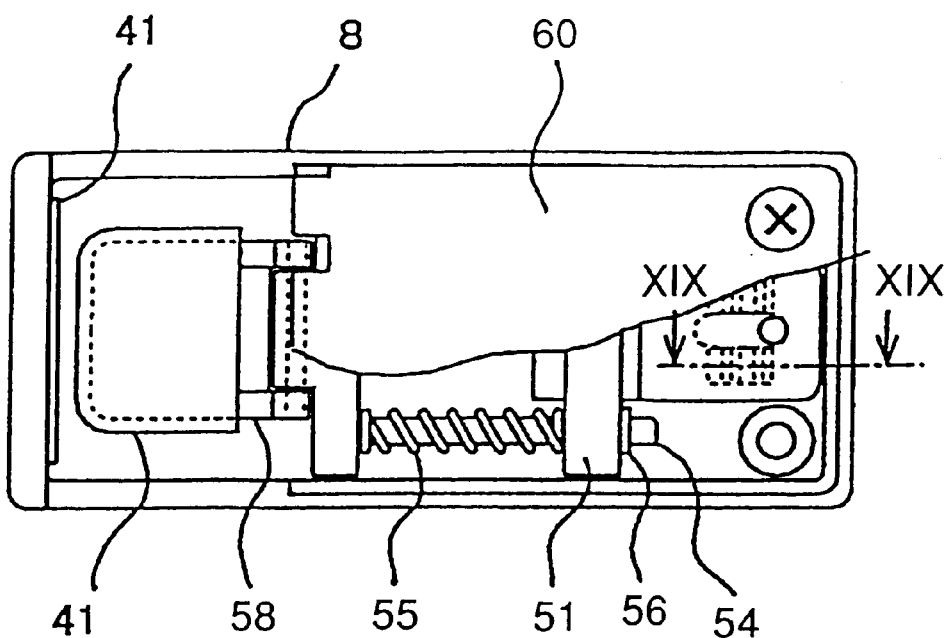
FIG. 18 is a bottom view of the video camera in the sixth embodiment of the invention.
Figure 19:
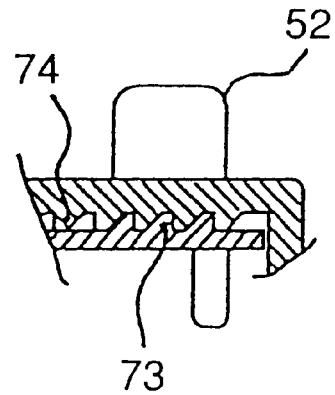
FIG. 19 is a cross sectional view along line XIX—XIX in FIG. 18.

FIG. 18 is a bottom view of the video camera in this embodiment with the bottom cover cut away partially. FIG. 19 is a cross sectional view along line XIX—XIX in FIG. 18 illustrating a cross section of a main portion of the button. At the respective slide surfaces of button 52 and stand portion 8 that are opposite to each other, engaging portions 73 and 74 each having concave and convex parts are provided respectively to button 52 and stand portion 8 and those engaging portions 73 and 74 engage with each other.

Between engaging portion 73 with concave and convex parts of button 52 and guide 51, a groove 59 extending from side to side is provided to reduce the thickness of the resin portion and thus give flexibility thereto so that button 52 can be pushed down. Engaging portions 73 and 74 are each shaped into a rib with a cross section of a right triangle, the plane corresponding to the hypotenuse thereof inclines downward to the front. Accordingly, engaging portion 73 easily passes over engaging portion 74 to move forward like ratchet, while the engagement of those portions should be released by pushing down button 52 so as to allow engaging portion 73 to move backward.

At least one of engaging portions 73 and 74 has a plurality of concave and convex parts. By moving button 52 back and forth, the position at which engaging portions 73 and 74 are engaged is changed thus the position of guide 51 can be changed.

Figure 20:
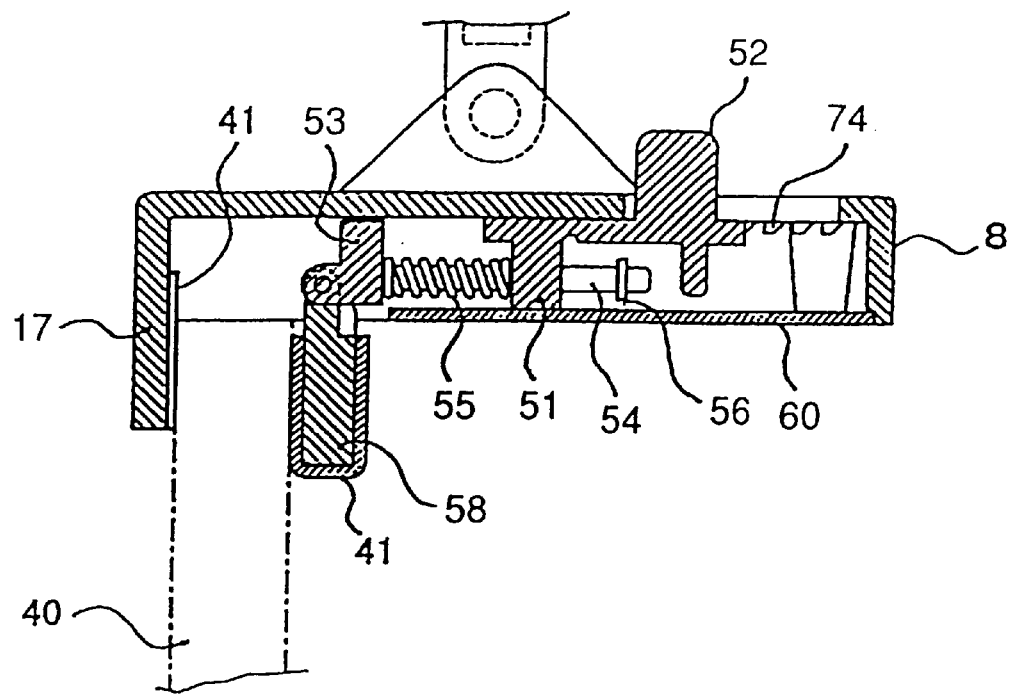
FIG. 20 is a side cross sectional view of the video camera in the sixth embodiment of the invention illustrating that the video camera is secured to an attachment body such as flat display.
Figure 21:
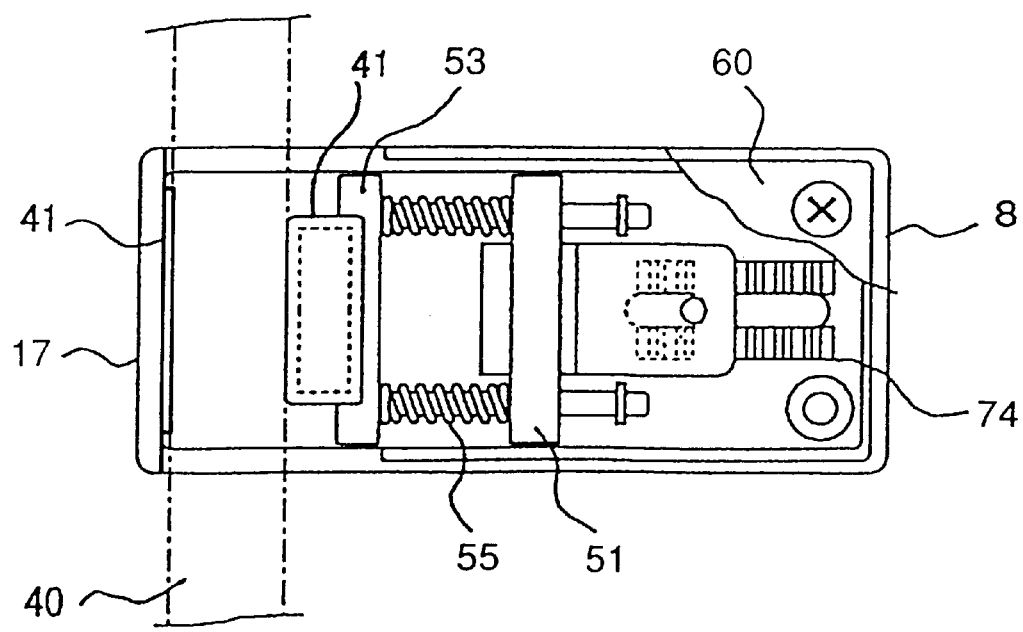
FIG. 21 is a bottom view of the video camera in the sixth embodiment of the invention illustrating that the video camera is secured to an attachment body such as flat display.

FIG. 20 is a side cross sectional view illustrating that the video camera pinches an attachment body between its components and FIG. 21 is a bottom view of FIG. 20.

Referring to FIGS. 20 and 21, attachment body 40 is a flat display or the like to which the video camera is attached, and an antiskid piece 41 formed of material such as rubber having a great frictional resistance is provided to each of the surfaces of edge portion 17 and lever portion 58 that are in contact with the attachment body 40 held between those portions of the video camera.

Figure 22:
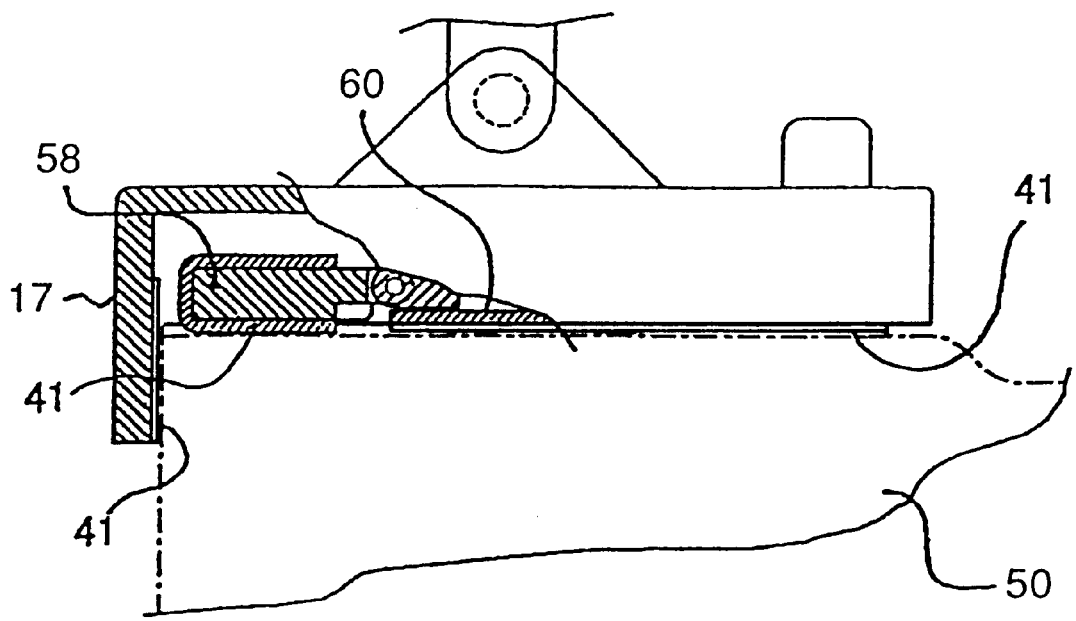
FIG. 22 is a side cross sectional view of the video camera in the sixth embodiment illustrating that the video camera is mounted on a CRT display.

FIG. 22 is a side cross sectional view illustrating that the video camera of the present invention is mounted for use on a CRT display. Antiskid piece 41 formed of material such as rubber having a great frictional resistance is provided on the bottom surface of lever portion 58 such that the antiskid piece contacts CRT display 50, and antiskid piece 41 formed of material such as rubber having a great frictional resistance is also provided on the surface of bottom cover 60.

An operation carried out in this structure is described below. Referring to FIGS. 17 and 18, when the video camera is to be fixed on the edge of attachment body 40 such as flat display or the like, lever portion 58 attached to sliding member 53 is pulled downward with a finger (fingers), edge portion 17 is placed along one surface of attachment body 40, and button 52 is moved forward with a finger (fingers) such that lever portion 58 abuts on the opposite surface, i.e. attachment body 40 is pinched.

At this time, the flexibility of groove 59 allows engaging portion 73 to move forward and pass over the plane corresponding to hypotenuse of the right triangular section of engaging portion 74, and accordingly the integrally formed guide 51 moves forward. Simultaneously, sliding member 53 and lever portion 58 advance via elastic member 55 and thus lever portion 58 is brought into contact with attachment body 40.

If button 52 is further pushed forward in this state, sliding member 53 and lever portion 58 do not move because they abut on attachment body 40, while guide 51 moves forward against the biasing force of elastic member 55. Accordingly, the biasing force of elastic member 55 is transmitted to lever portion 58 and attachment body 40 is held between edge portion 17 and lever portion 58 of the video camera.

When button 52 is released from the finger(s), the engagement of engaging portions 73 and 74 at this position is maintained and no backward movement occurs. Antiskid pieces 41 provided respectively to edge portion 17 and lever portion 58 can prevent the video camera from shifting due to vibration or the like which occurs when attachment body 40 is pinched, and thus more stable holding and fixing property is achieved.

When the video camera is to be detached from attachment body 40, the flexibility of groove 59 is utilized to temporarily push down button 52 so as to release the engagement of engaging portions 73 and 74. The backward movement thereof is then allowed to move guide 51 backward. On the way, guide 51 is caught by stop ring 56 functioning as a stopper which is provided to slide shaft 54, and thereafter guide 51, sliding member 53 and lever portion 58 simultaneously move backward. Attachment body 40 is thus released and then the video camera can be detached from attachment body 40.

The video camera cannot hold CRT display 50 with a great thickness by utilizing lever portion 58. The video camera is then mounted on the upper surface of CRT display 50 by placing edge portion 17 along the front edge of CRT display 50 with lever portion 58 housed as shown in FIG. 17. In this state, movement, shift, fall or the like of the video camera due to vibration, impact or the like can be avoided by antiskid piece 41 placed on the bottom of lever portion 58.

The effect of preventing movement, shift, fall or the like of the video camera can be enhanced when the video camera is mounted on CRT display 50, by forming antiskid piece 41 of lever portion 58 and that on the bottom of bottom cover 60 such that they are at the same plane.

Seventh Embodiment

The seventh embodiment of the present invention is described in detail now in conjunction with FIGS. 23 to 28.

This embodiment is different from the sixth embodiment only in that the structure related to a stand portion 9 of the former is different from that related to stand portion 8 of the latter. Description of other components is not repeated here and the same components are denoted by the same reference character for description.

Figure 23:
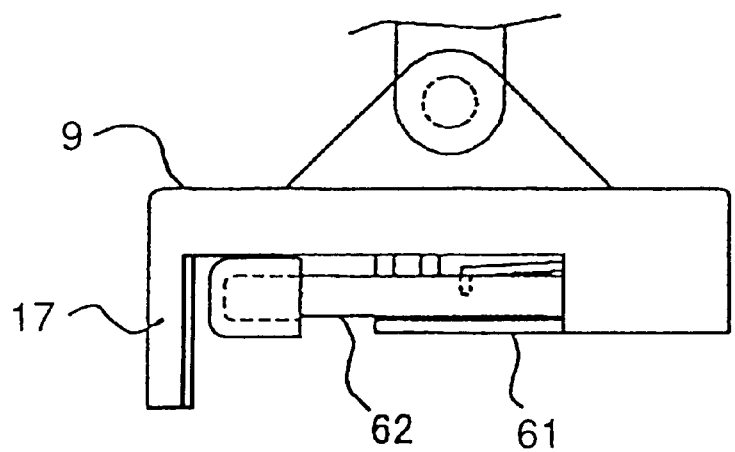
FIG. 23 is a side view of a stand portion of a video camera in a seventh embodiment of the invention.
Figure 24:
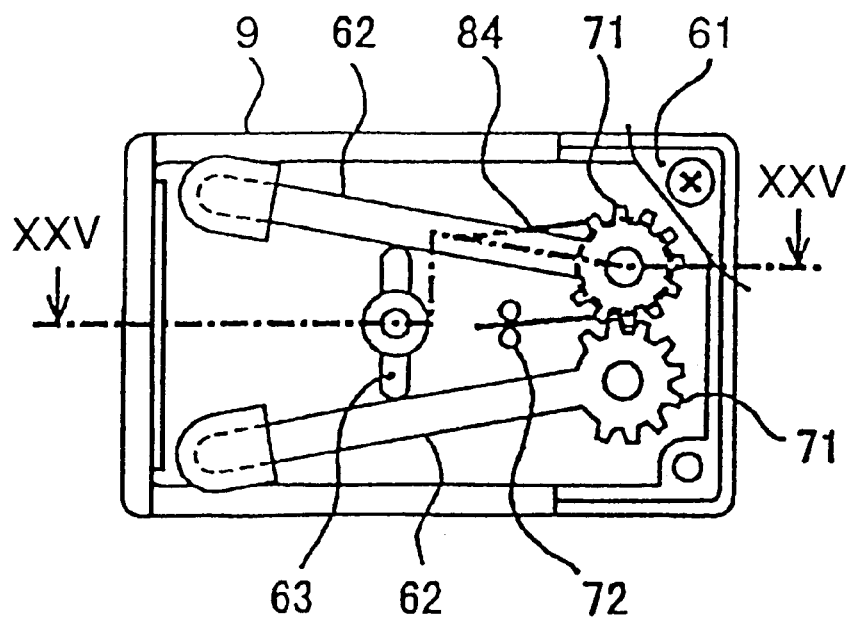
FIG. 24 is a bottom view of the video camera in the seventh embodiment of the invention.
Figure 25:
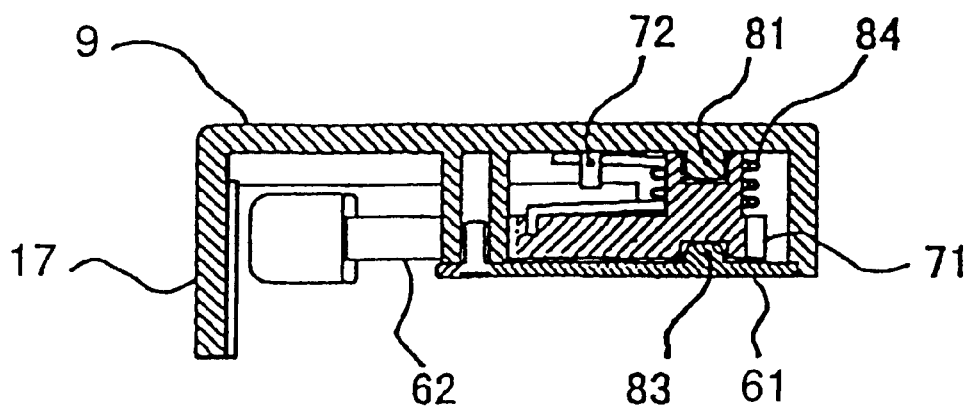
FIG. 25 is a cross sectional view of the stand portion of the video camera in the seventh embodiment of the invention taken along line XXV—XXV in FIG. 24.
Figure 26:
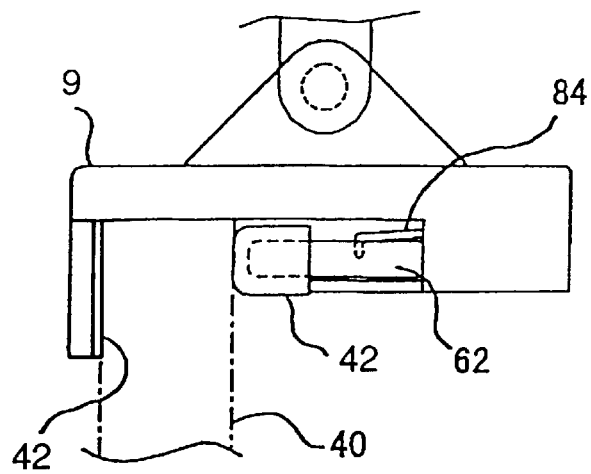
FIG. 26 is a side cross sectional view of the video camera in the seventh embodiment of the invention illustrating that the video camera is secured to an attachment body such as flat display.
Figure 27:
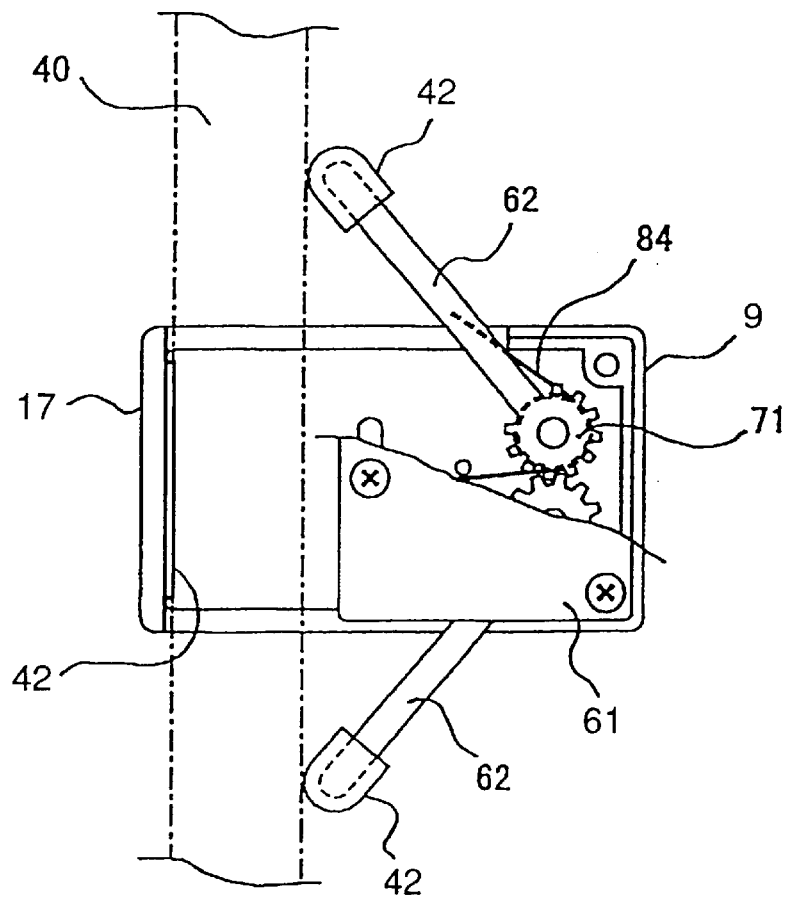
FIG. 27 is a bottom view of the video camera in the seventh embodiment of the invention illustrating that the video camera is secured to an attachment body such as flat display.

FIG. 23 is a side view of a video camera in the seventh embodiment, FIG. 24 is a bottom view thereof with a partially cut away bottom cover, FIG. 25 is a side cross sectional view of stand potion 9 taken along line XXV—XXV in FIG. 24. FIG. 26 is a side view illustrating that the video camera is secured to an attachment body such as flat display, and FIG. 27 is a bottom view of FIG. 26.

Stand portion 9 is shaped into a box with an opening at the bottom and substantially rectangular when viewed from the above or below, and its longitudinal direction corresponds to the forward and backward direction. A flat bottom cover 61 which covers the opening at the bottom of stand portion 9 is secured to stand portion 9 by fixing means such as screwing member. A lower holding portion 7 is pivotally supported on the upper surface of stand portion 9 as described above, and an edge potion 17 is perpendicularly placed on the anterior side of stand portion 9 for fixing attachment body 40 such as a flat display of a personal computer.

A pair of leg members 62 each have a gear 71 on one end and the other end forms a pinching section for holding attachment body 40 between it and edge portion 17. The pinching section and the section of edge portion 17 which abut on attachment body 40 each have an antiskid piece 42 formed of material such as rubber having a high frictional resistance. On the posterior side of the space formed by stand portion 9 and bottom cover 61, two pairs of bosses 81 and 83 are placed in the space such that they oppositely protrude respectively from stand portion 9 and bottom cover 61 to pivotally support gear 71 between bosses 81 and 83, in order to allow gears 71 of leg members 62 to engage with each other and rotate in the horizontal direction.

In this way, leg members 62 can be rotated about bosses 81 and 83 by gears 71 in the opposite directions respectively. An elastic member 84 formed of torsion coil spring or the like is provided with its one end fixed to leg member 62 and the other end attached to a fixed rib 72 provided to stand portion 9 such that the pinching section on the other end of leg member 62 is usually located on the back of edge portion 17 of stand portion 9, i.e. the pair of leg members 62 is always biased to close.

A projection 63 is placed at stand portion 9 and biasing force of elastic member 84 causes leg members 62 to close to the position of projection 63. The bottom of the leading pinching section of leg member 62 is not covered with bottom cover 61. Therefore, the pinching section can be manipulated with any finger (fingers) from below stand portion 9. Further, the side of stand portion 9 is partially cut away so as to allow leg members 62 to laterally open.

Figure 28:
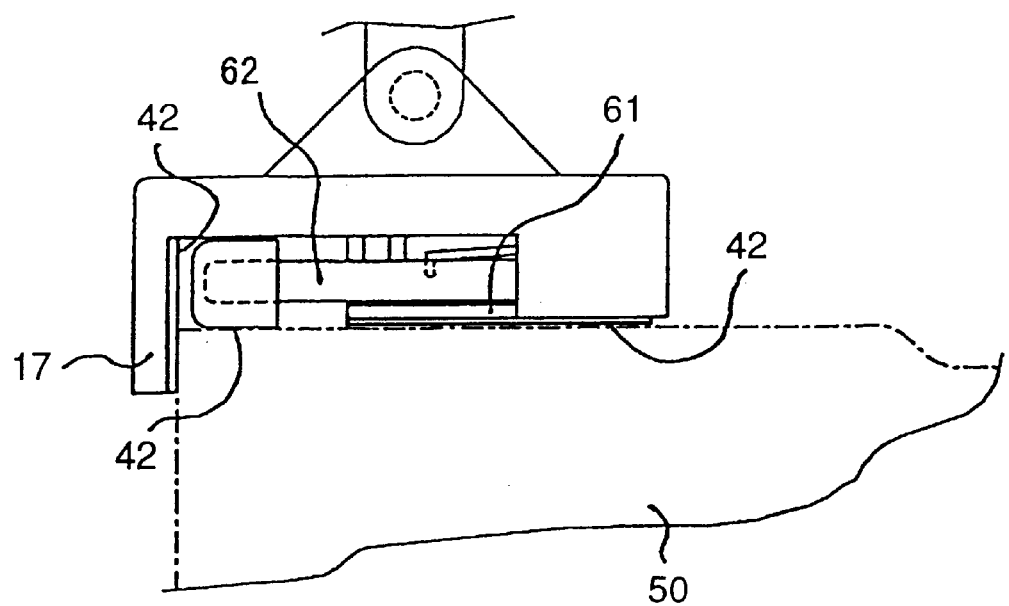
FIG. 28 is a side cross sectional view of the video camera in the seventh embodiment of the invention illustrating that the video camera is mounted on a CRT display.

FIG. 28 is a side cross sectional view illustrating that the video camera of this embodiment is mounted for use on CRT display 50. Antiskid piece 42 formed of material such as rubber having a high frictional resistance is provided on the bottom of the leading pinching section of leg member 62 such that antiskid piece 42 contacts CRT display 50, and antiskid piece 42 formed of material such as rubber having a high frictional resistance is provided on the surface of bottom cover 61.

An operation in this structure is described below. Referring to FIGS. 23 and 24, when the video camera is to be fixed for use on the edge of attachment body 40 such as flat display, the pinching sections on the leading ends of one leg members 62 are pulled with fingers against the biasing force of elastic member 84 to cause the section to open. Consequently, one gear 71 rotates and the other gear 71 which is engaged with the one gear 71 rotates in the opposite direction. Accordingly, leg members 62 open to the light and left respectively.

Attachment body 40 is then held in the space between edge portion 17 and the pinching sections on the leading ends of leg members 62 and then leg members 62 are released from the fingers. Consequently, attachment body 40 can be held between edge portion 17 and the pinching sections on the leading ends of leg members 62 by the biasing force of elastic member as shown in FIGS. 26 and 27. When the video camera is to be detached from attachment body 40, leg members 62 may just be opened against the biasing force of elastic member 84.

Antiskid pieces 42 provided respectively to edge portion 17 and the pinching sections on the leading ends of leg members 62 can prevent shift of the video camera due to vibration which occurs when attachment body 40 is pinched. The video camera can thus be held and secured more stably.

Although this embodiment employs elastic member 84 applied only to one leg member 62, an elastic member 84 may similarly be provided to the other leg member 62 in order to increase the biasing force. Both ends of a pulling coil spring may be fixed to respective leg members 62 so as to bias leg members 62 in the direction which causes leg members 62 to close (not shown).

If the attachment body is a CRT display or the like with a great thickness, it is impossible to pinch CRT display 50 using leg members 62 so as to attach the video camera to the display. Accordingly, as shown in FIG. 28, edge portion 17 is placed along the front edge of CRT display 50 with leg members 62 housed, and thus the video camera is mounted on the upper surface of CRT display 50. In this state, antiskid piece 42 provided on the bottom of the pinching section on the leading end of leg member 62 can avoid movement, shift, fall or the like of the video camera due to vibration, impact or the like.

Further, if antiskid piece 42 on the bottom of the pinching section on the leading end of leg member 62 and antiskid piece 42 on the bottom of bottom cover 61 are formed to be located substantially at the same plane, the effect of preventing movement, shift, fall or the like of the video camera mounted on CRT display 50 can be enhanced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video camera comprising a main body case having therein a camera portion imaging an object and a camera control portion performing image signal processing and control relative to the camera portion, a holding portion rotatably holding the main body case, and a stand portion rotatably holding the holding portion, further comprising:

an abutment piece which is perpendicularly placed on anterior side of a bottom of said stand portion and abuts on an attachment body to which the video camera is attached;

a lever portion which is rotatably placed on posterior side of the bottom of said stand portion; and bias means for biasing the lever portion toward the bottom of said stand portion, said lever portion including a lever main body with its one end pivotally supported by said stand portion and an abutment portion located at the other end of the lever main body and formed to abut on the attachment body, and said lever portion holding the attachment body between said abutment portion and said abutment piece when the lever portion is used and being housed and pressurized to abut on said stand portion when it is not used.

2. The video camera according to claim 1, wherein an edge portion of said stand portion is perpendicularly placed downward to form a vertical wall, and said lever potion is housed in said vertical wall when it is not used.

3. The video camera according to claim 1, wherein said abutment portion has a flat abutment surface which abuts on the attachment body and said abutment portion is rotatably supported at a leading end of said lever main body such that said flat abutment surface which is in surface contact with the attachment body when the lever portion is used.

4. The video camera according to claim 3, wherein an antiskid piece is provided to a surface of said abutment piece that abuts on and holds the attachment body and/or to the abutment surface of said abutment portion that holds the attachment body.

5. The video camera according to claim 1, wherein an antiskid piece is provided to a bottom surface of said lever portion when said lever portion is not used and housed.

6. The video camera according to claim 2, wherein said abutment piece is integrated with and extends from the vertical wall of said stand portion.

7. The video camera according to claim 3, wherein when said lever portion is not used, a tab which is integrally formed with said abutment portion faces a hole placed at said lever portion.

8. The video camera according to claim 7, wherein said abutment portion and said tab are integrally formed of resin and said tab is flexible relative to said abutment portion.

* * * * *